US012578275B2

(12) United States Patent
Moretto

(10) Patent No.: US 12,578,275 B2
(45) Date of Patent: Mar. 17, 2026

(54) MEASURING HEAD AND MEASUREMENT APPARATUS FOR PERFORMING SURFACE-ENHANCED RAMAN SPECTROSCOPIC MEASUREMENTS

(71) Applicant: Endress+Hauser Optical Analysis, Inc., Ann Arbor, MI (US)

(72) Inventor: Justin Moretto, Apex, NC (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 191 days.

(21) Appl. No.: 18/391,884

(22) Filed: Dec. 21, 2023

(65) Prior Publication Data

US 2025/0208047 A1 Jun. 26, 2025

(51) Int. Cl.
*G01N 21/65* (2006.01)

(52) U.S. Cl.
CPC ... *G01N 21/658* (2013.01); *G01N 2201/0633* (2013.01); *G01N 2201/0634* (2013.01); *G01N 2201/0636* (2013.01)

(58) Field of Classification Search
CPC ......... G01N 21/658; G01N 2201/0633; G01N 2201/0634; G01N 2201/0636; G01N 21/01; G01N 21/03; G01N 2021/0389
See application file for complete search history.

(56) References Cited

U.S. PATENT DOCUMENTS

2004/0046121 A1 3/2004 Golden et al.
2006/0205092 A1* 9/2006 Lackritz ........... G01N 33/54373
436/525

(Continued)

FOREIGN PATENT DOCUMENTS

DE 19615380 A1 3/1997

OTHER PUBLICATIONS

Jo, Mankyu et al., Graphene as a metal passivation layer: Corrosion-accelerator and inhibitor, Carbon, vol. 116, pp. 232-239, May 2017.
Graphene Gives Gold Nanoparticles Some Stability, Medical Device Markets, MD+MI Qmed, Jun. 6, 2009 (https://www.mddionline.com/medical-device-markets/graphene-gives-gold-nanoparticles-some-stability, last accessed Dec. 11, 2023).

(Continued)

*Primary Examiner* — Dominic J Bologna
*Assistant Examiner* — Akbar H. Rizvi
(74) *Attorney, Agent, or Firm* — Christopher R. Powers; Endress+Hauser (USA) Holding, Inc.

(57) ABSTRACT

A measuring head and a measurement apparatus comprising a measuring head for performing surface-enhanced Raman spectroscopic measurements. The measuring head comprises a housing, an optical device including a window closing off an opening of the housing and a prism extending into the interior of the housing, and a SERS-substrate disposed on an outer side of the measuring head. The SERS-substrate includes a nanostructured layer and a chemically inert, transparent passivation layer. The optical device is evanescently coupled to the SERS-substrate and configured to receive excitation light transmitted to the optical device through the housing, to refract the excitation light towards the SERS-substrate such that an evanescent field extends from the SERS-substrate into a medium adjacent an outside surface of the passivation layer, and to receive Raman scattered light emanating from the medium through the SERS-substrate and to direct the Raman scattered light through the housing.

18 Claims, 3 Drawing Sheets

(56) References Cited

U.S. PATENT DOCUMENTS

| | | |
|---|---|---|
| 2007/0225579 A1 | 9/2007 | Lucassen et al. |
| 2008/0174774 A1 | 7/2008 | Bratkovski |
| 2011/0118570 A1 | 5/2011 | Pedersen |
| 2021/0164900 A1* | 6/2021 | Zerulla ................ G01N 21/658 |
| 2021/0262924 A1* | 8/2021 | Ye ........................ G01N 33/579 |
| 2022/0381689 A1* | 12/2022 | Lavchiev ............. G01N 21/553 |

OTHER PUBLICATIONS

Berger, Michael, Carbon encapsulation of gold nanoparticles increases their stability, Nanotechnology 101 Explainers, Apr. 28, 2009. (https://www.nanowerk.com/spotlight/spotid=10319.php, last accessed Dec. 11, 2023).

Reed, Jason et al., Graphene-Enabled Silver Nanoantenna Sensors, Nano Lett., Jul. 2012, pp. 4090-4094 (https://pubs.acs.org/doi/full/10.1021/nl301555t, last accessed Dec. 11, 2023).

Xu, Weigao et al., Graphene-Veiled Gold Substrate for Surface-Enhanced Raman Spectroscopy, Advanced Materials, Feb. 2013.

Xu, Weigao et al., Graphene: A Platform for Surface-Enhanced Raman Spectroscopy, Small, Apr. 2013.

Hohn, Evan-Maria et al., Raman Spectroscopic Detection in Continuous Microflow Using a Chip-Integrated Silver Electrode as an Electrically Regenerable Surface-Enhanced Raman Spectroscopy Substrate, Anal Chem, Jul. 2019.

Knauer, Maria et al., A flow-through microarray cell for the online SERS detection of antibody-captured *E. coli* bacteria, Anal Bioanal Chem, vol. 203, pp. 2663-2667, 2012.

* cited by examiner

MEASURING HEAD AND MEASUREMENT APPARATUS FOR PERFORMING SURFACE-ENHANCED RAMAN SPECTROSCOPIC MEASUREMENTS

TECHNICAL FIELD

The present disclosure relates to surface-enhanced Raman spectroscopy and, in particular, to a measuring head and a measurement apparatus for performing surface-enhanced Raman spectroscopic measurements of at least one measurand of a medium.

BACKGROUND

Conventional Raman spectrometers commonly include a monochromatic light source transmitting monochromatic excitation light to a sample of a medium and a spectrometric unit determining and providing measured spectra of Raman scattered light emanating from the illuminated sample. The measured spectra are, e.g., provided to an evaluation unit for determining and providing a measurand of the medium, e.g., a concentration of a target analyte included in the medium, based on a previously determined model for determining the measurand based on spectral intensities of the measured spectra.

One of the disadvantages of conventional Raman spectroscopy is that the intensity of the Raman scattered light emanating from the illuminated sample is relatively low. This limits the measurement range achievable with conventional Raman spectroscopy. As an example, measurements of concentrations of a target analyte included in a medium are normally limited to concentrations exceeding a certain minimum concentration value, e.g., a minimum concentration value of 50 ppm.

In consequence, conventional Raman spectroscopy is unsuitable for applications in which measurements of considerably lower concentrations are required and/or desirable. These applications, e.g., include applications in the life science industry, in bioprocessing and in the pharmaceutical industry, where concentrations of target analytes may be significantly lower than the minimum concentration required for conventional Raman spectroscopy.

In this respect, surface-enhanced Raman spectroscopy (SERS) constitutes a promising alternative to conventional Raman spectroscopy. In SERS, an enhancement of Raman scattered light emitted by molecules of target analytes is achieved by exposing the molecules to an evanescent field emanating from a SERS-substrate receiving excitation light. SERS-substrates that have been investigated in the past include thin films exhibiting a nanostructured surface, e.g., a nanostructured noble metal surface. A disadvantage of SERS is, however, that most SERS-substrates constitute fragile objects that should be protected from the environment, e.g., to prevent damage and/or contamination of the SERS-substrate.

Due to the short range of the evanescent field emanating from illuminated SERS-substrates, SERS measurements are commonly performed under measurement conditions in which molecules dispersed in a colloidal material are accommodated in a small cavity adjoining the SERS-substrate and in which molecules adsorbed on the SERS-substrate are subjected to the evanescent field.

The cavity accommodating the colloidal material provides the advantage that it protects the SERS-substrate and enables static measurement conditions promoting adsorption. Depending on the design of the measurement instrumentation employed, the cavity may also be required to enable transmitting the excitation light to the SERS-substrate along a transmission path extending through the cavity and/or to enable reception of the Raman scattered light along a reception path extending through the cavity.

Adsorption of molecules, in particular of large molecules, on the SERS-substrate may, however, disrupt the structure and/or destroy the molecules. This may prevent further use of the colloidal material. In addition, adsorption is an exothermic process, which may also prevent further use of the colloidal material. Another problem associated with adsorption is that an exchange process should be performed between consecutive SERS measurements, whereby the SERS-substrate is refreshed and/or previously adsorbed molecules are removed from the SERS-substrate. As a result, SERS measurements on adsorbed molecules are rather unsuitable for performing in-line measurements, e.g., measurements on a medium contained, processed and/or produced in a container, e.g., a bioreactor.

A further problem is that cavities required in SERS measurements to accommodate the colloidal material are normally incompatible with in-line measurements and that they may be very difficult to clean and/or to sterilize. This makes measurement instrumentation including or requiring cavities unsuitable for applications requiring aseptic or sterile conditions. In this respect, cavities are incompatible with cleaning in place (CIP) and/or steaming in place (SIP) protocols that may be required in these applications.

US 2008/0174774 A1 discloses a Raman spectroscopic measurement apparatus for spectroscopic analysis of analyte molecules deposited near a metallic film, e.g., a film comprising gold and having a thickness of 20 nm to 40 nm. The metallic film comprises lithographically patterned features designed to intensify surface plasmon resonance along the metallic film to promote the emission of Raman radiation from the analyte molecules. Within the apparatus, the metallic film is positioned between a liquid or gaseous medium and a prism positioned in evanescent communication with the metallic film. The apparatus further includes an excitation light source transmitting monochromatic excitation light to the prism and a radiation detector detecting Raman radiation emanating from the analyte molecules. With respect to evanescent communication, US 2008/0174774 A1 discloses two embodiments.

In the first embodiment, the evanescent communication is achieved by a Kretschmann configuration. In this case, the metallic film is deposited on the prism, the analyte molecules are deposited near an upper side of the metallic film facing away from the prism, and the radiation detector is positioned at a distance above the upper side of the metallic film facing away from the prism. Correspondingly, the radiation detector receives Raman radiation transmitted along an optical path extending through the liquid or gaseous medium.

Even though this is not explicitly stated in US 2008/0174774 A1, it seems justified to assume that positioning the metallic film between the liquid or gaseous medium and the prism and detecting the Raman radiation emitted by molecules in a direction facing away from the metallic film requires the apparatus according to the first embodiment to include a cavity adjoining the metallic film that accommodates the liquid or gaseous medium and protects the metallic film.

As outlined above, cavities are normally incompatible with in-line measurements and cannot be easily cleaned and/or sterilized. In addition, the apparatus, in particular the cavity and the metallic film, may be incompatible with cleaning in place (CIP) and/or steaming in place (SIP) protocols required in many applications, where high standards of hygiene must be met.

In the second embodiment, the evanescent communication is achieved by an Otto configuration in which the metal film is separated from the prism by a small gap, e.g., a gap of 10 nm to 20 nm. Here, the analyte molecules are positioned between the prism and the metal film on the lower side of the metallic film facing the prism, and the Raman radiation emitted in a generally downward direction facing away from the metallic film is detected. In the second embodiment, the gap constitutes an extremely small cavity exhibiting the disadvantages mentioned above.

According to US 2008/0174774 A1 the metallic film is preferably derivatized or functionalized by attachment of receptors or ligands that promote the binding of a particular analyte molecule in close proximity to its surface. However, this aspect limits the field of use of the apparatus to measurements related to this one particular analyte.

In addition, binding of analyte molecules is undesirable in applications in which in-line measurements are required or desirable. Just like adsorption, binding may modify and/or impair the medium including the analyte in a manner that may prevent further use of the medium and an exchange process may have to be performed between consecutive measurements, whereby the metallic film is refreshed and/or molecules are removed from the metallic film.

Accordingly, there remains a need for further contributions in this area of technology.

SUMMARY

The present disclosure includes a measuring head for performing surface-enhanced Raman spectroscopic measurements of at least one measurand of a medium, the measuring head comprising:

a housing surrounding an interior of the measuring head;

an optical device including a window closing off an opening of the housing and a prism extending into the interior of the housing; and a SERS-substrate disposed on an outer side of the measuring head adjacent the medium during a measurement operation; the SERS-substrate including a nanostructured layer and a chemically inert, transparent passivation layer;

wherein optical device is evanescently coupled to the SERS-substrate and configured to:

receive excitation light transmitted to the optical device along an excitation light path extending through the interior of the housing;

refract the received excitation light towards the SERS-substrate such that an evanescent field extends from the evanescently coupled SERS-substrate into the medium adjacent an outside surface of the passivation layer during the measurement operation; and receive Raman scattered light emanating from the medium during exposure to the evanescent field through the evanescently coupled SERS-substrate and to direct the Raman scattered light along a measurement light path extending through the interior of the housing.

The measuring head provides the advantage that it enables in-line measurements of the measurand.

In this respect, the chemical inertness of the passivation layer of the SERS-substrate provides the advantage that it effectively prevents any adsorption of molecules dispersed in the medium, which might otherwise damage or even destroy the molecules and/or which may otherwise alter or impair the medium in a manner preventing further use of the medium. It further provides the advantage that molecules can move freely through the evanescent field extending in front of the passivation layer without binding to the SERS-substrate and without fouling the SERS-substrate. This enables the measuring head to be continuously operated without requiring an exchange process to be performed between consecutive measurements.

The present disclosure recognizes that the optical transparency of the passivation layer enables evanescent coupling between the optical device and the SERS-substrate to be used as bi-directional coupling for generating the evanescent field and for transmitting Raman scattered light. Contrary to the common belief that Raman scattered light emanating from the medium in a direction facing away from the SERS-substrate should be detected, this aspect enables for Raman scattered light to be received through the SERS-substrate.

In this respect, the optical device receiving the excitation light through the interior of the housing of the measuring head and directing the Raman scattered light received via the evanescently coupled SERS-substrate provides the advantage that the measuring head neither includes nor requires any limited size cavity for accommodating the medium, which may not be compatible with hygiene requirements prevailing at a measurement site. In addition, the robustness of the passivation layer provides the advantage that the measuring head can be cleaned and/or sterilized in place, e.g., by cleaning in place (CIP) and/or sterilization in place (SIP) procedures performed at the measurement site, where the measuring head is installed.

In certain embodiments, the measuring head is an in-line probe.

In further embodiments, the window and the prism consist of a transparent material or a transparent glass and/or the optical device is a monolithic element including the window and the prism.

In certain embodiments, the optical device is sealed, brazed, compression bonded or press fitted into an aperture of the housing.

According to an embodiment, the SERS-substrate is disposed or deposited on an outside surface of the transparent window facing away from the prism; the passivation layer is disposed or deposited on the nanostructured layer; the passivation layer covers an outside surface of the SERS-substrate adjacent the medium during the measurement operation; the nanostructured layer includes a nanostructured noble metal layer or a nanostructured gold layer; the passivation layer is a graphene layer; and/or the passivation layer is a thin layer or a thin graphene layer having a thickness of 0.1 nm to 5 nm.

In certain embodiments, the prism comprises:

a reception surface receiving excitation light transmitted to the optical device along the excitation light path and refracting incident excitation light through the window towards the SERS-substrate; and a transmission surface receiving measurement light including Raman scattered light received by the optical device through the evanescently coupled SERS-substrate and refracting the incident measurement light onto the measurement light path.

According to a further embodiment, the measuring head further comprises a filter or a notch-filter inserted in the measurement light path. In this embodiment the optical device is configured to transmit measurement light including Raman scattered light received by the optical device through the evanescently coupled SERS-substrate to the filter along a first segment of the measurement light path; and the filter is configured to attenuate light included in the measurement light having wavelengths in a limited wavelengths range including an excitation wavelength of the excitation light, and to allow the Raman scattered light along a second segment of the measurement light path.

In certain embodiments, the excitation light path or a first section of the excitation light extends parallel to a longitudinal axis of the housing, and the measurement light path or a second section of the measurement light path extends parallel to the longitudinal axis of the housing.

Further embodiments include the measuring head further comprising at least one of:

a process connector for mounting the measuring head onto a corresponding counter connector surrounding an opening at a measurement site;

an input port for connecting the measuring head to an external excitation light source; and an output port for connecting the measuring head to an external spectrometric unit.

According to a first embodiment, the SERS-substrate is disposed or deposited on a front surface of the measuring head and/or on an outside surface facing away from the prism of the transparent window closing off the opening extending through a front wall of the housing.

According to a refinement of the first embodiment, the measuring head is configured to be flush mounted at a measurement site and/or includes a process connector configured to be mounted onto a corresponding counter connector surrounding an opening at a measurement site such that a front side of the measuring head extending through the counter connector is flush with a mounting surface surrounding the opening.

According to a second embodiment, the SERS-substrate is disposed or deposited on a side surface of the measuring head, and/or on an outside surface facing away from the prism of the transparent window closing off the opening extending through a side wall of the housing.

According to a refinement of the second embodiment, the measuring head further comprises:

a first reflector inserted in the excitation light path and configured to reflect excitation light received by the first reflector along a first section of the excitation light path towards the optical device along a second section of the excitation light path; and a second reflector inserted in the measurement light path and configured to reflect measurement light, which is received by the second reflector along a first section of the measurement light path, along a second section of the measurement light path.

According to a further refinement of the second embodiment, the first section of the excitation light path extends parallel to the longitudinal axis of the housing; the second section of the excitation light path extends perpendicular to the longitudinal axis of the housing; the first section of the measurement light path extends perpendicular to the longitudinal axis of the housing; and the second section of the measurement light path extends parallel to the longitudinal axis of the housing.

In further embodiments:

the measuring head is an elongated insertion probe; and/or the measuring head includes a process connector configured to be mounted onto a corresponding counter connector surrounding an opening at a measurement site such that an elongated section of the measuring head protrudes in front of a mounting surface surrounding the opening; and/or the SERS-substrate is disposed or deposited on a front surface or a side surface of the measuring head; or on a side surface of the measuring head being configured to be installed at a measurement site such that an orientation of the SERS-substrate is adjustable by rotating the measuring head along its longitudinal axis.

In certain embodiments, the measuring head further comprises at least one of:

at least one further optical element;

an input optic receiving excitation light provided to the measuring head and directing the received excitation light to the optical device;

a collimating lens collimating excitation light provided to the measuring head via an input port of the measuring head towards a reception surface of the prism refracting the incident excitation light towards the SERS-substrate; and an output optic or a collimating lens receiving Raman scattered light from the optical device and directing the incident Raman scattered light to an output port of the measuring head.

The present disclosure includes a measurement apparatus for performing surface-enhanced Raman spectroscopic measurements of at least one measurand of a medium, the measurement apparatus comprising:

the measuring head disclosed herein;

an excitation light source generating and providing monochromatic excitation light to the measuring head;

a spectrometric unit receiving Raman scattered light from the measuring head and determining and providing measured spectra of the medium based on the received Raman scattered light; and a processing unit connected to and/or communicating with the spectrometric unit and configured to determine and to provide measurement results of each measurand of the medium based on the measured spectra from the spectrometric unit and a previously determined model for determining measurement results of the respective measurand based on spectral intensity values of the measured spectra.

In certain embodiments, the measurement apparatus further comprises at least one of:

an optical fiber connecting or releasably connecting the measuring head to the excitation light source;

an optical fiber connecting or releasably connecting the measuring head to the spectrometric unit; and a filter or a notch-filter receiving measurement light including Raman scattered light from the measuring head, attenuating light included in the incident measurement light having wavelengths in a limited wavelengths range including an excitation wavelength of the excitation light, and conveying the Raman scattered light to the spectrometric unit.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

To visualize elements of different sizes, the figures use a non-scale representation.

DETAILED DESCRIPTION

The present disclosure includes a measuring head 10 for performing surface-enhanced Raman spectroscopic measurements (SERS-measurements) of at least one measurand of a medium M and includes a measurement apparatus 100 comprising the measuring head 10.

The medium M is, e.g., a liquid or gaseous medium, a colloidal medium including molecules of at least one target analyte, and/or a process medium, e.g., a process medium contained, transported, provided, processed and/or produced at a measurement site in a given application, e.g., an application in the life science industry, in bioprocessing or in the pharmaceutical industry.

Depending on the application, where the measuring head 10 and/or the measurement apparatus 100 is employed, the at least one measurand, e.g., include a concentration of at least one target analyte included in the medium M, a pH-value of the medium, and/or at least one other measurand determinable based on Raman spectroscopy.

Figure 1:
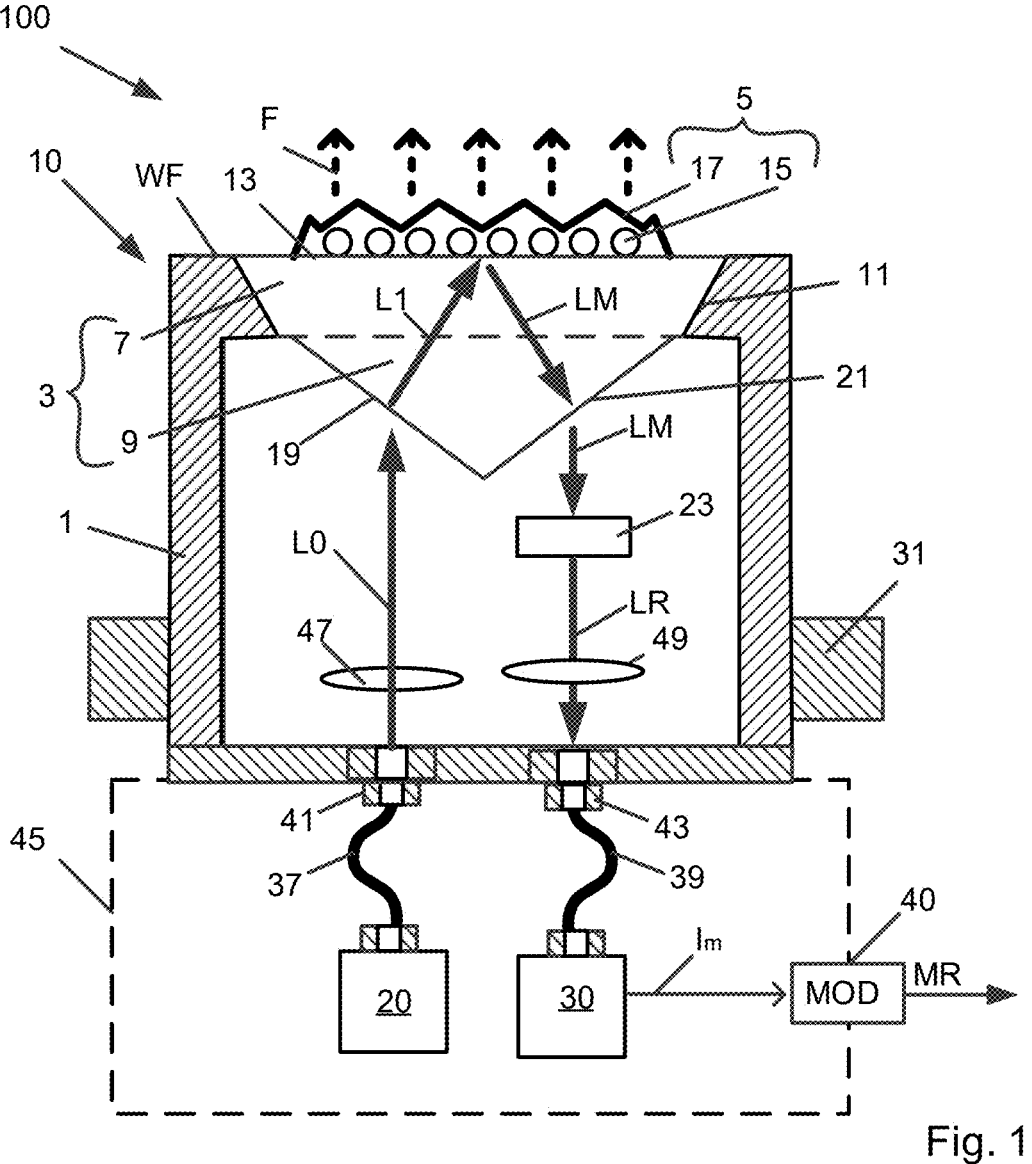
FIG. 1 shows a Raman spectroscopic measurement apparatus comprising a measuring head according to the present disclosure.

An example of the measurement apparatus 100 comprising the measuring head 10 is shown in FIG. 1.

The measuring head 10 disclosed herein comprises a housing 1 surrounding an interior of the measuring head 10, an optical device 3 and a SERS-substrate 5.

In certain embodiments, the housing 1 is, e.g., an elongated and/or tubular housing. In addition, or as an alternative, in certain embodiments, the housing 1 is, e.g., a metal housing, e.g., a stainless steel housing.

The optical device 3 includes a transparent window 7 closing off an opening of the housing 1 and a prism 9 extending into the interior of the housing 1.

Figure 2:
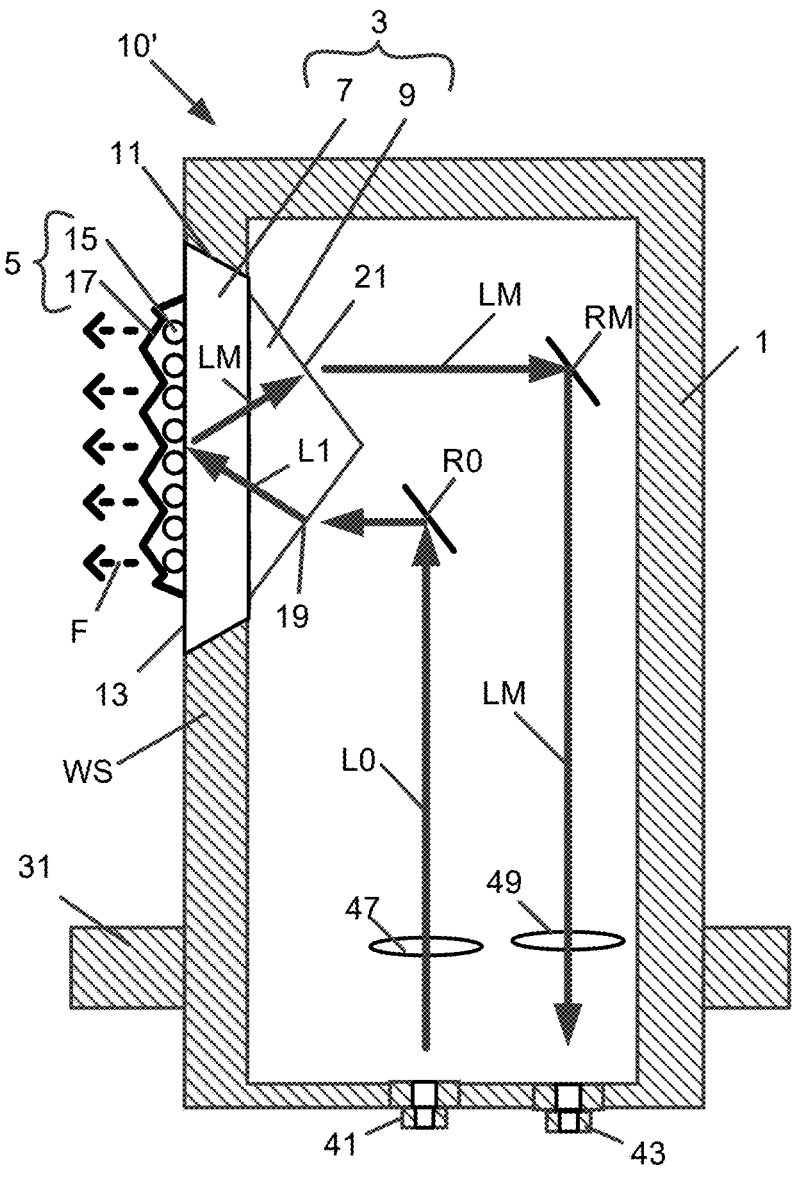
FIG. 2 shows a further embodiment of the measuring head according to the present disclosure.

As shown in FIG. 1, in certain embodiments, the transparent window 7, e.g., closes off an opening extending through a front wall WF of the housing 1. FIG. 2 shows an alternative embodiment of the measuring head 10', wherein the transparent window 7 closes off an opening extending through a side wall WS of the housing 1 of the measuring head 10'.

Regardless of the position of the opening, in certain embodiments the optical device 3 is, e.g., a monolithic element including both the window 7 and the prism 9. In such an embodiment, the monolithic element is, e.g., a single part consisting of a transparent material, e.g., a glass or sapphire.

As an alternative, the window 7 and the prism 9 are, e.g., configured as individual parts consisting of a transparent material, e.g., a glass or sapphire. In such an embodiment, the prism 9 and the window 7 preferably consist of the same transparent material, and the prism 9 is, e.g., disposed inside the housing 1 such that an outside surface of the prism 9 adjoins an inner surface of the window 7 facing into the interior of the housing 1.

In either such embodiments, the optical device 3 is secured inside the housing 1 such that the transparent window 7 closes off the opening in the housing 1. This can be achieved in various ways.

As an example, in certain embodiments, the optical device 3 is, e.g., inserted into an aperture inside the opening from the outside. Insertion of the optical device 3 from the outside, rather than through the interior of the housing 1 is particularly advantageous, when the housing 1 is an elongated or tubular housing exceeding a certain axial length.

As shown in FIGS. 1 and 2, the aperture, e.g., includes an inner surface 11, e.g., a tapered inner surface, surrounding and/or adjacent an outer surface of the optical device 3. The optical device 3 is, e.g., sealed into the aperture. The seal between the optical device 3 and the housing 1, e.g., achieved by the optical device 3 being brazed, compression bonded or press fitted into the aperture. As an alternative the measuring head 10, 10' may include other means for securing the optical device 3 inside the housing 1 and/or for providing the seal between the optical device 3 and the housing 1.

Regardless of how the optical device 3 is secured inside the housing 1, the SERS-substrate 5 is disposed on an outer side of the measuring head 10, 10' adjacent the medium M during a measurement operation. FIGS. 1 and 2 show embodiments, wherein the SERS-substrate 5 is disposed, e.g., deposited, on an outside surface 13 of the transparent window 7 facing away from the prism 9. Correspondingly, in FIG. 1 the SERS-substrate 5 is disposed on a front surface of the measuring head 10, and in FIG. 2 the SERS-substrate 5 is disposed on a side surface of the measuring head 10'.

The SERS-substrate 5 includes a nanostructured layer 15 and a chemically inert, optically transparent passivation layer 17. As shown in FIGS. 1 and 2, the passivation layer 17 is, e.g., disposed, e.g., deposited, on the nanostructured layer 15 and covers an outside surface of the SERS-substrate 5 adjacent the medium M during the measurement operation.

With respect to the SERS-substrate 5, SERS-substrates disclosed in the article titled, "Graphene-Veiled Gold Substrate for Surface-Enhanced Raman Spectroscopy," of Weigao Xu, Jiaqi Xiao, Yanfeng Chen and Yabin Chen, published Feb. 13, 2013, in volume 25 of the journal, Advanced Materials, as well as SERS-substrates disclosed in the article titled, "Graphene: A platform for surface-enhanced Raman spectroscopy," of Weigao Xu, Nannan Mao and Jin Zhang, published in volume 9 of the journal Small in 2013, may be used.

Correspondingly, in certain embodiments, the nanostructured layer 15 is, e.g., a nanostructured noble metal layer, e.g., a nanostructured gold layer. In addition, or as an alternative, in certain embodiments, the passivation layer 17 is, e.g., a graphene layer. The graphene layer provides the advantage that it is optically transparent, chemically inert and mechanically robust.

In certain embodiments, the passivation layer 17 is, e.g., thin layer, e.g., a thin graphene layer and/or a thin layer having a thickness of 0.1 nm to 5 nm.

The optical device 3 is evanescently coupled to the SERS-substrate 5.

As shown in FIGS. 1 and 2, the optical device 3 is configured to receive excitation light L0 transmitted to the optical device 3 along an excitation light path extending through the interior of the housing 1, and to refract the incident excitation light L0 towards the SERS-substrate 5 such that an evanescent field F extends from the evanescently coupled SERS-substrate 5 into the medium M adjacent an outside surface of the passivation layer 17 during the measurement operation.

In the embodiments shown in FIGS. 1 and 2, the excitation light L0 is directed to the SERS-substrate 5 via a reception surface 19 of the prism 9 receiving the excitation light L0 transmitted to the optical device 3 along the excitation light path and refracting incident excitation light L0 as indicated by the arrow LI shown in FIGS. 1 and 2 through the window 7 towards the SERS-substrate 5.

The optical device 3 is further configured to receive Raman scattered light LR emanating from the medium M during exposure of the medium M to the evanescent field F through the evanescently coupled SERS-substrate 5, and to direct the received Raman scattered light LR along a measurement light path extending through the interior of the housing 1.

In the embodiments shown in FIGS. 1 and 2, this is achieved by the prism 9 including a transmission surface 21 receiving measurement light LM, including the Raman scattered light LR, received by the optical device 3 through the evanescently coupled SERS-substrate 5, and refracting the incident measurement light LM onto the measurement light path extending through the interior of the housing 1.

Depending on the design of the optical device 3, in particular the orientation of the reception surface 19 of the prism 9 in relation to the excitation light path and the outside surface 13 of the window 7, the measurement light LM, e.g., includes excitation light L0 that is reflected onto the transmission surface 21. In addition, the measurement light LM may include Rayleigh scattered light emanating from the medium M that is received by the optical device 3 via the evanescently coupled SERS-substrate 5.

In certain embodiments, the measuring head 10, 10' is, e.g., configured to provide the Raman scattered light LR by providing the measurement light LM including the Raman scattered light LR.

As an alternative, in certain embodiments, the measuring head 10, 10', e.g., includes a filter 23, e.g., a notch-filter. As shown in FIG. 1, in such embodiments, the optional filter 23 is, e.g., inserted in the measurement light path extending through the housing 1 and configured to receive the measurement light LM transmitted to the filter 23 along a first segment of the measurement light path, to attenuate light included in the incident measurement light LM having wavelengths in a limited wavelengths range including the excitation wavelength of the excitation light L0, and to allow the Raman-shifted, Raman scattered light LR along a second segment of the measurement light path.

Regardless of whether the measuring head 10, 10' includes the filter 23 or not, in certain embodiments, the measuring head 10, 10' is, e.g., configured such that the excitation light path and the measurement light path are antiparallel paths. This is, e.g., achieved by selecting the transparent material of the optical device 3 and designing the shape of the prism 9, in particular the orientation of the reception surface 19 and the transmission surface 21 accordingly.

In the embodiment shown in FIG. 1, the excitation light path and the measurement light path are antiparallel straight paths extending parallel to a longitudinal axis of the housing 1.

In the embodiment shown in FIG. 2, the excitation light path and the measurement light path are L-shaped antiparallel paths. This is, e.g., achieved by the measuring head 10' including a first reflector R0, e.g., a first mirror, and a second reflector RM, e.g., a second mirror, disposed inside the housing 1.

The first reflector R0 is inserted in the excitation light path and configured to reflect excitation light L0 received by the first reflector R0 along a first section of the excitation light path extending parallel to the longitudinal axis of the housing 1 towards the optical device 3 along a second section of the excitation light path extending perpendicular to the longitudinal axis of the housing 1.

The second reflector RM is inserted in the measurement light path and configured to reflect measurement light LM, which is received by the second reflector RM along a first section of the measurement light path extending perpendicular to the longitudinal axis of the housing 1, along a second section of the measurement light path extending parallel to the longitudinal axis of the housing 1.

Embodiments in which at least a section of the excitation light path and at least a section of the measurement light path both extend parallel to the longitudinal axis of the housing 1 provide the advantage of a high degree of flexibility with respect to an axial length of the housing 1 and correspondingly also the measuring head 10, 10'.

In certain embodiments, the housing 1 and correspondingly also the measuring head 10, 10', e.g., has an axial length of 1 cm to 80 cm or more.

As mentioned above, the present disclosure further includes the measurement apparatus 100 comprising the measuring head disclosed herein, e.g., the measuring head 10 shown in FIG. 1 or the measuring head 10' shown in FIG. 2.

As shown in FIG. 1, the measurement apparatus 100 further comprises an excitation light source 20 generating and providing excitation light L0 to the measuring head 10, a spectrometric unit 30 receiving the Raman scattered light LR from the measuring head 10, and a processing unit 40, e.g., a computer with a memory, a microprocessor or another type of signal and/or data processing unit, connected to and/or communicating with the spectrometric unit 30.

The excitation light source 20 is preferably a monochromatic light source, e.g., a laser, operative to generate monochromatic excitation light L0 having a predetermined excitation wavelength to the measuring head 10, 10'. In certain embodiments, the excitation wavelength is, e.g., a wavelength in the visual or near infrared wavelengths range, e.g., a wavelength between 400 nm and 1200 nm.

The spectrometric unit 30 is configured to determine and provide measured spectra $I_m$ of the medium M based on the received Raman scattered light LR.

Figure 3:
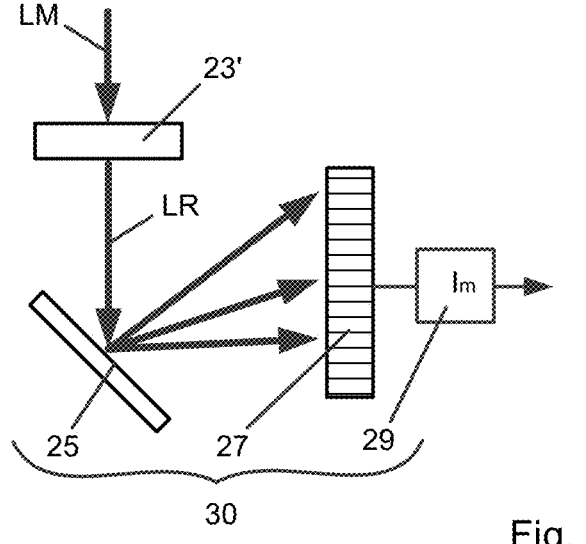
FIG. 3 shows a filter and a spectrometric unit.

An exemplary embodiment of the spectrometric unit 30 is shown in FIG. 3. As shown, this spectrometric unit 30, e.g., includes a disperser 25, e.g., a diffractive or holographic grating, dispersing incident Raman-shifted, Raman scattered light LR, a detector 27 receiving the dispersed light, and a signal processor 29, e.g., a microprocessor, connected to the detector 27 and configured to determine and to provide the measured spectra $I_m$. In this respect, the detector 27 is, e.g., configured to determine intensities and generate detector signals corresponding to spectral intensities of the incident dispersed light. In certain embodiments, the detector 27, e.g., includes an array of detection elements, e.g., an array of charge-coupled devices (CCD) or an array of photodiodes, each receiving a fraction of the dispersed light and determining and generating a detector signal corresponding to the intensity of the received fraction, e.g., the number of photons received in time periods of a given duration, to the signal processor 29 determining and providing spectral intensity values of the measured spectra I$_m$ based on the detector signals.

In embodiments, wherein the measuring head 10 includes the optional filter 23 described above, the Raman scattered light LR is conveyed to the spectrometric unit 30 by the filter 23.

In embodiments wherein the measuring head 10' does not include the optional filter 23, the Raman scattered light LR is, e.g., provided to the spectrometric unit 30 by the spectrometric unit 30 receiving the measurement light LM from the optical device 3 of the measuring head 10'. As an alternative, shown in FIG. 3, the measurement apparatus 100, e.g., includes a filter 23', e.g., a notch-filter, positioned outside the measuring head 10', that is configured to receive the measurement light LM from the measuring head 10' and to convey the Raman scattered light LR to the spectrometric unit 30.

The processing unit 40 is configured to determine and to provide measurement results MR of at least one measurand of the medium M based on the measured spectra I$_m$ provided by the spectrometric unit 30 and a previously determined model MOD, e.g., stored in the memory, for determining measurement results MR of the respective measurand based on spectral intensity values of the measured spectra I$_m$.

Depending on the application where the measurement apparatus 100 is employed, the measurement results MR of the at least one or each measurand are, e.g., employed to monitor, to regulate and/or to control a process performed at the application and/or to monitor and/or to control the quality of products processed and/or produced at the respective applications.

The invention provides the advantages mentioned above. Individual components of the measuring head 10, 10' and/or the measurement apparatus 100 may be implemented in different ways without deviating from the scope of the invention. Several optional embodiments are described in more detail below.

As shown in FIGS. 1 and 2, the measuring head 10, 10' is designed as an in-line probe configured to perform in-line measurements.

In certain embodiments, the measuring head 10, 10', e.g., includes a process connector 31, e.g., a fastener, a flange or another type of connector, for mounting the measuring head 10, 10' onto a corresponding counter connector 33 at a measurement site.

Figure 4:
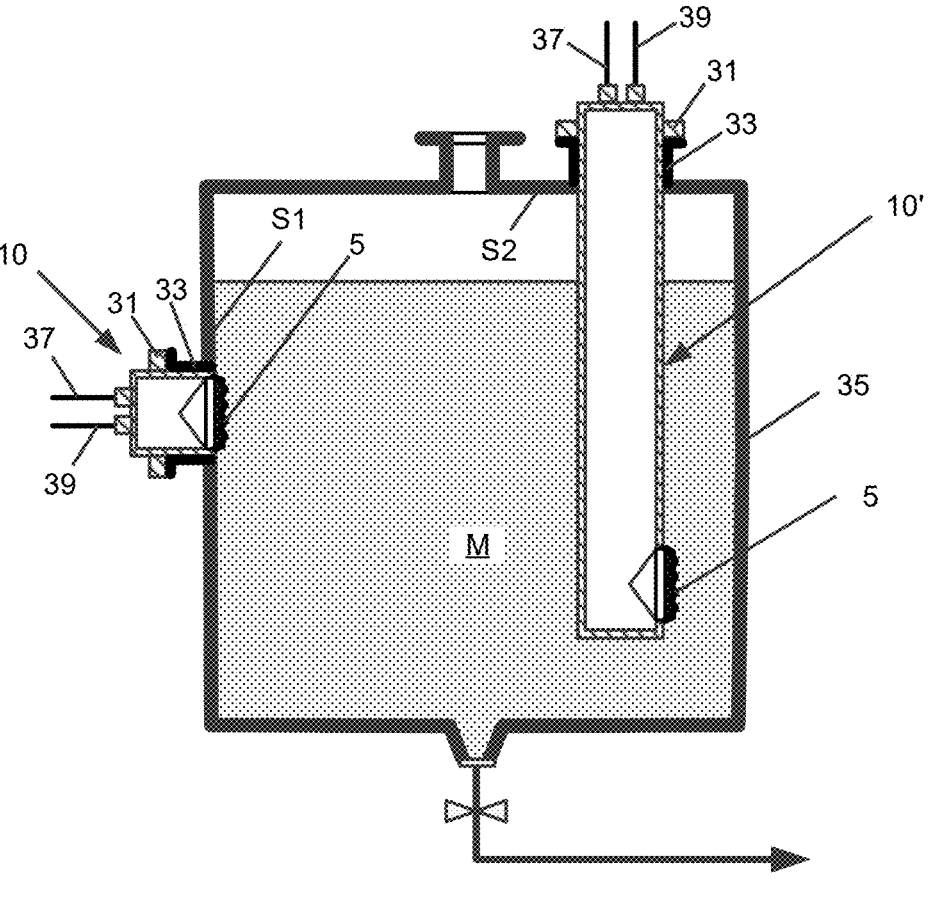
FIG. 4 shows two measuring heads according to the present disclosure installed on container.

FIG. 4 shows an example of an application, wherein two exemplary embodiments of the measuring head 10, 10' described above are installed on a container 35, e.g., a bioreactor, a tank, a vessel or another type of open or closed container, containing and/or transporting the medium M.

In FIG. 4, the first measuring head 10 corresponding to the measuring head 10 shown in FIG. 1 is, e.g., configured to be flush mounted at the measurement site. In this case, the axial length of the housing 1 and correspondingly also of the measuring head 10 is correspondingly short. As an example, the housing 1 of the first measuring head 10 and correspondingly also the first measuring head 10 may have an axial length of one or several centimeters.

Correspondingly, the process connector 31 of the first measuring head 10 is, e.g., configured to be mounted onto the corresponding counter connector 33 surrounding an opening at the measurement site such that the front side of the measuring head 10 extending through the counter connector 33 is flush with a mounting surface S1 surrounding the opening at the measurement site. As shown in FIG. 4, where the first measuring head 10 is installed on a port provided on a sidewall of the container 35 including the counter connector 33, in this embodiment only the flush mounted front side of the measuring head 10 adjoins the medium M contained in the container 35.

The second measuring head 10' is, e.g., designed as an elongated insertion probe configured to be mounted at the measurement site such that SERS-substrate 5 is positioned in a predetermined measurement region. In such an embodiment, the axial length of the housing 1 and correspondingly also of the measuring head 10' is preferably dimensioned as required in the respective application in which the second measuring head 10' is going to be used. As an example, the housing 1 of the second measuring head 10' may have an axial length of up to 80 cm or more.

In FIG. 4, the process connector 31 of the second measuring head 10' surrounds a rear end section of the second measuring head 10'. As shown, the second measuring head 10' is mounted onto the corresponding counter connector 33 surrounding an opening such that an elongated section of the second measuring head 10' protrudes in front of a mounting surface S2 surrounding the opening.

As shown in FIG. 4, based on the second measuring head 10' corresponding to the measuring head 10' shown in FIG. 2, in embodiments in which the measuring head 10' is an elongated insertion probe, the SERS-substrate 5 is, e.g., disposed on one of the side surfaces of the measuring head 10'. This provides the advantage that the orientation of the SERS-substrate 5 at the measurement site, e.g., inside the container 35, is adjustable by rotating the measuring head 10' around the longitudinal axis of the housing 1. As an example, the measuring head 10' may be installed such that the SERS-substrate 5 is disposed on the outer side surface of the measuring head 10' facing away from a region inside the container 35 where disturbances and/or turbulences are likely to occur, e.g., during filling and/or emptying of the container 35 or when the medium M is stirred.

As an alternative, the SERS-substrate 5 may be disposed on the front surface of the elongated insertion probe, e.g., as shown in FIG. 1.

In certain embodiments, the measurement apparatus 100 is, e.g., configured as a modular apparatus. In such an embodiment, the measuring head 10, 10' constitutes one of the modules of the measurement apparatus 100 that is connected to or configured to be connected to, or to be releasably connected to, the excitation light source 20 and the spectrometric unit 30. This configuration can be achieved in various ways.

As shown in FIG. 1, in certain embodiments, the measurement apparatus 100, e.g., includes an optical fiber 37 connecting or releasable connecting the measuring head 10, 10' to the excitation light source 20 and an optical fiber 39 connecting or releasable connecting the measuring head 10 to the spectrometric unit 30.

Correspondingly, in certain embodiments, the measuring head 10, 10', e.g., includes an input port 41 for connecting the measuring head 10, 10' to the external excitation light source 20 and an output port 43 for connecting the measuring head 10, 10' to the external spectrometric unit 30.

The modular apparatus 100 provides the advantage that only the measuring head 10, 10' is exposed to the process conditions prevailing at the measurement site, whereas other components, e.g., the excitation light source 20, the spectrometric unit 30 and/or the processing unit 40, may be positioned at a remote location.

As an alternative, the measurement apparatus 100 may be designed as a compact measurement device. In such an embodiment, the excitation light source 20 and the spectrometric unit 30 are, e.g., accommodated in an apparatus housing that is mounted onto a rear end of the measuring head 10, e.g., as illustrated by the dotted line 45 shown in FIG. 1.

Regardless of whether the measuring head 10, 10' is configured as a module or as a component of a compact measurement device, in certain embodiments, the measuring head 10, 10' may include at least one further optical element. The further optical element(s), e.g., include an input optic 47 receiving the excitation light L0 from the excitation light source 20 and directing the received excitation light L0 to the optical device 3. As illustrated in FIGS. 1 and 2, the input optic 47, e.g., includes a collimating lens, e.g., a collimating lens adapted to collimate the excitation light L0 received via the input port 41 towards the reception surface 19 of the prism 9.

In addition, or as an alternative, the further optical element(s), e.g., include an output optic 49 adapted to receive the measurement light LM from the optical device 3, or the Raman scattered light LR from the filter 23, and to direct the incident light to the output port 43. As illustrated in FIGS. 1 and 2, the output optic 49, e.g., includes a collecting lens directing the measurement light LM or the Raman scattered light LR to the output port 43.

I claim:

1. A measuring head for performing surface-enhanced Raman spectroscopic (SERS) measurements of at least one measurand of a medium, the measuring head comprising:
   a housing surrounding an interior of the measuring head,
   an optical device including a window closing off an opening of the housing and a prism extending into the interior of the housing; and
   a SERS-substrate disposed on an outer side of the measuring head, which outer side is adjacent the medium during a measurement operation, the SERS-substrate including a nanostructured layer and a chemically inert, transparent passivation layer,
   wherein the optical device is evanescently coupled to the SERS-substrate and configured to:
      receive excitation light transmitted to the optical device along an excitation light path extending through the interior of the housing;
      refract the received excitation light towards the SERS-substrate such that an evanescent field extends from the evanescently coupled SERS-substrate into the medium adjacent an outside surface of the passivation layer during the measurement operation; and
      receive Raman scattered light emanating from the medium during exposure to the evanescent field through the evanescently coupled SERS-substrate and to direct the Raman scattered light along a measurement light path extending through the interior of the housing.

2. The measuring head according to claim 1, wherein the measuring head is adapted as an in-line probe.

3. The measuring head according to claim 1, wherein:
   the window and the prism consist of a transparent material or a transparent glass; and/or
   the optical device is a monolithic element including the window and the prism.

4. The measuring head according to claim 1, wherein the optical device is sealed, brazed, compression bonded, or press fitted into an aperture of the housing within the opening.

5. The measuring head according to claim 1, wherein, at least one of:
   the SERS-substrate is disposed or deposited on an outside surface of the window facing away from the prism;
   the passivation layer is disposed or deposited on the nanostructured layer;
   the passivation layer covers an outside surface of the SERS-substrate, which outside surface is adjacent the medium during the measurement operation;
   the nanostructured layer includes a nanostructured noble metal layer or a nanostructured gold layer;
   the passivation layer is a graphene layer; and
   the passivation layer is a thin layer or a thin graphene layer having a thickness of 0.1 nm to 5 nm.

6. The measuring head according to claim 1, wherein the prism comprises:
   a reception surface configured to receive excitation light transmitted to the optical device along the excitation light path and to refract incident excitation light through the window towards the SERS-substrate; and
   a transmission surface configured to receive measurement light including the Raman scattered light received by the optical device through the evanescently coupled SERS-substrate and to refract the incident measurement light onto the measurement light path.

7. The measuring head according to claim 1, further comprising a filter or a notch-filter inserted in the measurement light path, wherein:
   the optical device is configured to transmit measurement light including the Raman scattered light received by the optical device through the evanescently coupled SERS-substrate to the filter along a first segment of the measurement light path; and
   the filter is configured to attenuate light included in the measurement light having wavelengths in a limited wavelength range, including an excitation wavelength of the excitation light, and to allow the Raman scattered light to proceed along a second segment of the measurement light path.

8. The measuring head according to claim 1, wherein:
   the excitation light path or a first section of the excitation light path extends parallel to a longitudinal axis of the housing; and
   the measurement light path or a second section of the measurement light path extends parallel to the longitudinal axis of the housing.

9. The measuring head according to claim 1, further comprising at least one of:
   a process connector configured to enable mounting of the measuring head onto a corresponding counter connector surrounding an opening at a measurement site;
   an input port configured to enable connecting the measuring head to an external excitation light source; and
   an output port configured to enable connecting the measuring head to an external spectrometric unit.

10. The measuring head according to claim 1, wherein the SERS-substrate is disposed or deposited:
   on a front surface of the measuring head; and/or
   on an outside surface of the window, facing away from the prism, closing off the opening extending through a front wall of the housing.

11. The measuring head according to claim 10, wherein the measuring head:
   is configured to be flush mounted at a measurement site; and/or
   includes a process connector configured to be mounted onto a corresponding counter connector surrounding an opening at the measurement site such that a front side of the measuring head extending through the counter connector is flush with a mounting surface surrounding the opening.

12. The measuring head according to claim 1, wherein the SERS-substrate is disposed or deposited:

on a side surface of the measuring head; and/or on an outside surface of the window, facing away from the prism, closing off the opening extending through a side wall of the housing.

13. The measuring head according to claim 12, further comprising:

a first reflector disposed in the excitation light path and configured to reflect excitation light incident on the first reflector along a first section of the excitation light path, towards the optical device along a second section of the excitation light path; and a second reflector disposed in the measurement light path and configured to reflect measurement light incident on the second reflector along a first section of the measurement light path, along a second section of the measurement light path.

14. The measuring head according to claim 13, wherein:

the first section of the excitation light path extends parallel to the longitudinal axis of the housing;

the second section of the excitation light path extends perpendicular to the longitudinal axis of the housing;

the first section of the measurement light path extends perpendicular to the longitudinal axis of the housing; and the second section of the measurement light path extends parallel to the longitudinal axis of the housing.

15. The measuring head according to claim 1, wherein, at least one of:

the measuring head is an elongated insertion probe;

the measuring head includes a process connector configured to be mounted onto a corresponding counter connector surrounding an opening at a measurement site such that an elongated section of the measuring head protrudes in front of a mounting surface surrounding the opening; and the SERS-substrate is disposed or deposited:

on a front surface or a side surface of the measuring head; or on a side surface of the measuring head, wherein the measuring head is configured to be installed at the measurement site such that an orientation of the SERS-substrate is adjustable by rotating the measuring head along longitudinal axis thereof.

16. The measuring head according to claim 1, further comprising at least one of:

at least one further optical element;

an input optic adapted to receive excitation light provided to the measuring head and to direct the received excitation light to the optical device;

a collimating lens adapted to collimate excitation light provided to the measuring head via an input port of the measuring head towards a reception surface of the prism adapted to refract the incident excitation light towards the SERS-substrate; and an output optic or a collimating lens adapted to receive the Raman scattered light from the optical device and to direct the incident Raman scattered light to an output port of the measuring head.

17. A measurement apparatus for performing surface-enhanced Raman spectroscopic measurements of at least one measurand of a medium, the measurement apparatus comprising:

the measuring head according to claim 1;

an excitation light source configured to generate monochromatic excitation light, which is transmitted to the measuring head;

a spectrometric unit configured to receive the Raman scattered light from the measuring head and to determine and provide measured spectra of the medium based on the received Raman scattered light; and a processing unit connected to and/or in communication with the spectrometric unit and configured to determine and provide measurement results of each measurand of the medium based on the measured spectra provided by the spectrometric unit and a previously determined model for determining measurement results of the respective measurand based on spectral intensity values of the measured spectra.

18. The measurement apparatus according to claim 17, further comprising at least one of:

an optical fiber connecting or releasably connecting the measuring head to the excitation light source;

an optical fiber connecting or releasably connecting the measuring head to the spectrometric unit; and a filter or a notch-filter adapted to receive measurement light, including the Raman scattered light, from the measuring head, to attenuate light included in the incident measurement light having wavelengths in a limited wavelength range, including an excitation wavelength of the excitation light, and to convey the Raman scattered light to the spectrometric unit.

* * * * *